W. TODD.
HYDRANT.
No. 179,742. Patented July 11, 1876.
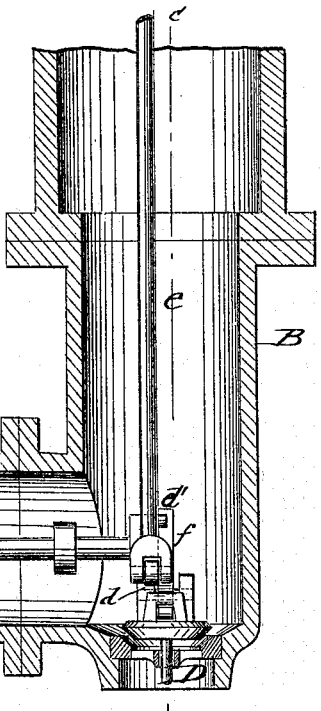
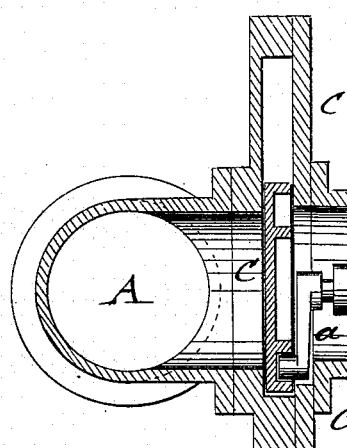
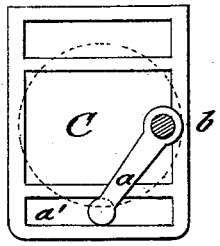
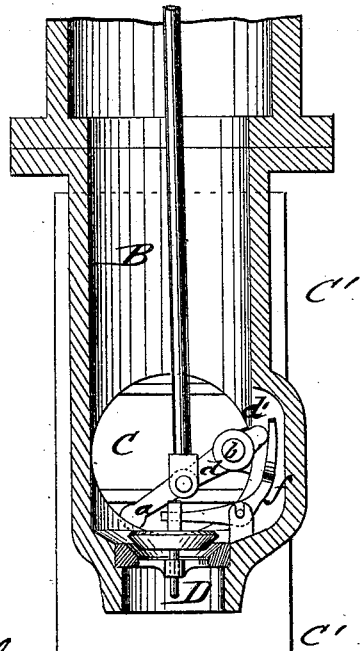
WITNESSES:
INVENTOR:
ATTORNEYS.

UNITED STATES PATENT OFFICE.

WILLIAM TODD, OF PORTLAND, MAINE.

IMPROVEMENT IN HYDRANTS.

Specification forming part of Letters Patent No. 179,742, dated July 11, 1876; application filed May 9, 1876.

*To all whom it may concern:*

Be it known that I, WILLIAM TODD, of Portland, Cumberland county, Maine, have invented a new and Improved Hydrant, of which the following is a specification:

In the accompanying drawing, Figure 1 represents a vertical longitudinal section of my improved service-pipe and gate for hydrants and other purposes. Fig. 2 is a vertical transverse section of the same on line C C, Fig. 1, and Fig. 3 is a detail view of the sliding gate that shuts off connection of main and service pipe.

Similar letters of reference indicate corresponding parts.

The invention relates to an improved service pipe and gate for post-hydrants, and for stores and houses, by which the water may be readily shut off from the main pipe and entirely drained off, so as to leave no water in the connecting-pipes, and prevent the freezing and bursting of the same, by means of a simple and readily-operated mechanism.

My invention consists of a sliding gate of the main pipe, and of a drain-valve of the connecting-pipe, that are jointly operated from the top of the hydrant, so that the gate is closed simultaneously with the opening of the drain-valve and vice versa.

In the drawing, A represents the main pipe, which is connected by the service-pipe to the hydrant, and to stores, houses, &c. The main A may be shut off from the service pipe by a gate, C, that slides in a suitable guide-casing, C', being operated by a crank, $a$, at the end of a crank-rod, $b$, turning in bearings of the service-pipe. The crank $a$ works in a guide-recess, $a'$ of the sliding gate, as shown in Fig. 3. The opposite end of the horizontal crank-rod $b$ has a rigid crank arm, $d$, to the end of which is pivoted a vertical upward-extending rod, $e$, that is operated by a hand-wheel, key, or otherwise, from the post of the hydrant-box or other part on the sidewalk or street. The vertical connecting-rod $e$ raises or lowers the gate, as desired, so as to furnish a water-supply from the main, or interrupt the same. A lug, $d'$, of the crank $d$, back of the pivot-bearings of the crank-shaft $b$, engages the upper end of a bell-crank lever, $f$, that is fulcrumed at its angle to suitable bearings, and connected by its lower arm to a valve, D, that closes the lower open part of the vertical section of the service-pipe. The crank $a$ and lug $d'$ of rod or shaft $b$ are so arranged, relatively, that when the former opens the gate the latter closes simultaneously the valve, and, vice versa, closes the gate and opens the valve. The horizontal part of the service-pipe has a slope or fall, by which a perfect drainage is produced through the valve on the closing of the gate, which renders the freezing up of the hydrant connecting-pipes in cold weather impossible, and keeps the hydrant always ready for use in case of fire, while saving the repairs and delay incidental to frozen and bursted pipes.

Having thus described my invention, what I claim as new, and desire to secure by Letters Patent, is—

1. The combination, with a main and service pipe of a hydrant, &c., of a sliding gate at the main, and of a drain-valve at the open vertical part of the connecting-pipe, the gate and valve being operated simultaneously, so that when one is closed the other is open, and vice versa, substantially as herein shown and described.

2. The combination with the main pipe and connecting-pipe, having guide-casing, of a sliding gate operated to open or close the main by crank-shaft and pivot-rod connection with the post of the hydrant, substantially as herein shown and described.

3. The combination of the post, connecting-rod, and crank-shaft, having lug, with the drain-valve and operating bell-crank lever, substantially as herein shown and described.

WILLIAM TODD.

Witnesses:
 EDWD. MASON,
 GEORGE RANDALL.